(12) United States Patent
Sainct et al.

(10) Patent No.: US 8,322,659 B2
(45) Date of Patent: Dec. 4, 2012

(54) METHOD FOR LIGHTENING THE WEIGHT OF FUEL STOWED ONBOARD DURING AN INTERPLANETARY MISSION

(75) Inventors: Herve Roland Sainct, LeCannet (FR); Xavier Roser, Cannes (FR); Vincent Martinot, Villeneuve-Tolosane (FR)

(73) Assignee: Thales, Neuilly-sur-Seine (FR)

( * ) Notice: Subject to any disclaimer, the term of this patent is extended or adjusted under 35 U.S.C. 154(b) by 270 days.

(21) Appl. No.: 12/494,877

(22) Filed: Jun. 30, 2009

(65) Prior Publication Data
US 2010/0006704 A1  Jan. 14, 2010

(30) Foreign Application Priority Data
Jul. 8, 2008 (FR) ...................................... 08 03878

(51) Int. Cl.
*B64G 1/10* (2006.01)
(52) U.S. Cl. .................. 244/158.4; 244/158 R; 244/164
(58) Field of Classification Search ............... 244/172.4, 244/172.5, 158.5, 158.4, 158.9, 158.1, 172.3, 244/172.2, 3.21
See application file for complete search history.

(56) References Cited

U.S. PATENT DOCUMENTS

| | | | |
|---|---|---|---|
| 4,790,499 A * | 12/1988 | Taylor et al. | 244/172.2 |
| 5,419,516 A * | 5/1995 | Leipold et al. | 244/172.5 |
| 6,491,258 B1 | 12/2002 | Boyd et al. | |
| 2001/0025212 A1 * | 9/2001 | Belbruno | 701/13 |
| 2003/0164428 A1 | 9/2003 | Anderman et al. | |
| 2006/0145024 A1 * | 7/2006 | Kosmas | 244/172.5 |
| 2007/0045475 A1 * | 3/2007 | Collyer et al. | 244/172.4 |
| 2008/0001361 A1 * | 1/2008 | Daniels | 277/315 |
| 2009/0140100 A1 * | 6/2009 | Mueller et al. | 244/158.9 |

FOREIGN PATENT DOCUMENTS
WO  WO 92/21561 A1  12/1992
WO  WO 00/13971 A2  3/2000

* cited by examiner

*Primary Examiner* — Christopher P Ellis
*Assistant Examiner* — Medhat Badawi
(74) *Attorney, Agent, or Firm* — Baker & Hostetler LLP

(57) ABSTRACT

The method for lightening the weight of fuel stowed onboard during an interplanetary mission is characterized in that it consists:
in launching (10a) a first orbiter spacecraft (1) from the Earth on a first interplanetary trajectory (31, 33) towards a target planet to be explored,
in launching (10b) a second orbiter spacecraft (2) from the Earth on a second interplanetary trajectory (32, 34) towards a rendezvous spot (38), the second interplanetary trajectory not comprising any phase of placing in orbit around the target planet,
in recovering a load to be transported and in loading it onto the first orbiter spacecraft (1),
in returning the first orbiter spacecraft (1) and the load from the target planet to the rendezvous spot (38),
in effecting a docking (14) of the two orbiter spacecraft (1, 2),
in returning at least the second orbiter spacecraft (2) and the load, from the rendezvous spot (38) to a terrestrial orbit (41).

11 Claims, 4 Drawing Sheets

METHOD FOR LIGHTENING THE WEIGHT OF FUEL STOWED ONBOARD DURING AN INTERPLANETARY MISSION

CROSS-REFERENCE TO RELATED APPLICATIONS

This application claims priority of French application no. FR 0803878, filed Jul. 8, 2008, the disclosure of which is hereby incorporated by reference in its entirety.

FIELD OF THE INVENTION

The present invention relates to a method for lightening the weight of fuel stowed onboard during an interplanetary mission. It applies notably to the field of interplanetary spacecraft, such as, for example, for a mission to explore the planet Mars, in a return-trip flight.

BACKGROUND OF THE INVENTION

The return of a crew and/or of samples of matter from a distant planet to the Earth makes it necessary inter alia to send a spacecraft, called an orbiter, to the planet which is to be explored and to return this spacecraft to the Earth. This operation gives rise, in the course of the journey, to several important manoeuvres and an associated consumption of weight of fuel since it is necessary, notably, for the spacecraft to accelerate in order to take off from the Earth, and then to brake before it arrives at the planet to be explored, to accelerate again in order to leave the planet and finally to brake before arriving on Earth.

The consumption of fuel being on the one hand very significant during periods of large variations in speed, that is to say during the various phases of takeoff and landing, and on the other hand all the higher the greater the total weight of the craft, these successive speed variations create an exponential amplification in the fuel requirements, called a "snowball" effect, and therefore in the weight to be carried. Typically, the weight of fuel necessary for an interplanetary mission is greater than the useful weight, called the dry weight, of the spacecraft.

The weight of fuel to be carried being very significant, it impacts enormously on the costs of the interplanetary mission as well as on the size and the weight of the orbiter spacecraft by demanding on departure, for example, a bigger and therefore more expensive rocket launcher.

To reduce the weight of fuel to be carried for an interplanetary mission, it is known to use, for the return to Earth, an aero-thermo-dynamic passive re-entry capsule which dissipates its energy directly into the terrestrial atmosphere during a re-entry phase. This re-entry capsule makes it possible to circumvent the last braking phase before landing on Earth but presents risks of accidents that are very critical for the terrestrial environment, notably when the mission, such as for example the American Genesis mission which was not successful in its Earth landing phase when retrieving samples of dust from a comet, consists in bringing back samples of matter.

SUMMARY OF THE INVENTION

The aim of the present invention is to remedy these drawbacks by proposing a method making it possible to economize on the weight of fuel to be carried for an interplanetary mission and not exhibiting the dangers, for the terrestrial environment, of passive capsules.

For this purpose, the subject of the invention is a method for lightening the weight of fuel stowed onboard during an interplanetary mission, comprising the steps of:
launching a first orbiter spacecraft from the Earth on a first interplanetary trajectory towards a target planet to be explored,
launching a second orbiter spacecraft from the Earth on a second interplanetary trajectory towards a rendezvous spot, the second interplanetary trajectory not comprising any phase of placing in orbit around the target planet,
recovering a load to be transported and loading it onto the first orbiter spacecraft,
returning the first orbiter spacecraft and the load from the target planet to the rendezvous spot,
effecting a docking of the two orbiter spacecraft,
returning at least the second orbiter spacecraft and the load, from the rendezvous spot to a terrestrial orbit.

Advantageously, the first orbiter spacecraft comprises, during its launch from the Earth, a weight of fuel corresponding solely to the weight necessary for the accomplishment of a first part of the mission which finishes at the rendezvous spot, at the time of docking.

Advantageously, the second orbiter spacecraft comprises a weight of fuel allowing it to take over from the first orbiter spacecraft after the docking and to finish the mission from the rendezvous spot until the return to terrestrial orbit.

Advantageously, the method furthermore consists in using at least one gravitational assistance of a planet or of a moon situated on the second interplanetary trajectory to further decrease the weight of fuel necessary for the accomplishment of the mission.

According to a first embodiment of the invention, after the docking phase, the two orbiter spacecraft return together to the terrestrial orbit.

Advantageously, the weight of fuel necessary for the return of the two orbiter spacecraft from the rendezvous spot to the terrestrial orbit is placed on the second orbiter spacecraft.

According to a second embodiment of the invention, the method furthermore consists, after the docking phase, in unloading the load from the first orbiter spacecraft into the second orbiter spacecraft, and then in abandoning the first orbiter spacecraft.

Preferably, the load is recovered by way of a first rocket or a first space shuttle launched from the target planet towards the first orbiter spacecraft and the first orbiter spacecraft is left in orbit around the target planet during the recovery of the load.

Preferably, the load is unloaded by way of a third spacecraft, chosen from among a space station, a second rocket or a second space shuttle launched from the Earth towards the second spacecraft, the second orbiter spacecraft, alone or tethered to the first orbiter spacecraft, being left in orbit around the Earth.

Preferably, the rendezvous spot is located on an encounter orbit situated between the target planet and Earth.

Advantageously, the load consists of passengers and/or of samples of matter collected from the target planet.

BRIEF DESCRIPTION OF THE DRAWINGS

Other features and advantages of the invention will be clearly apparent in the subsequent description given by way of purely illustrative and nonlimiting example, with reference to the appended schematic drawings which represent.

DETAILED DESCRIPTION

Figure 1:
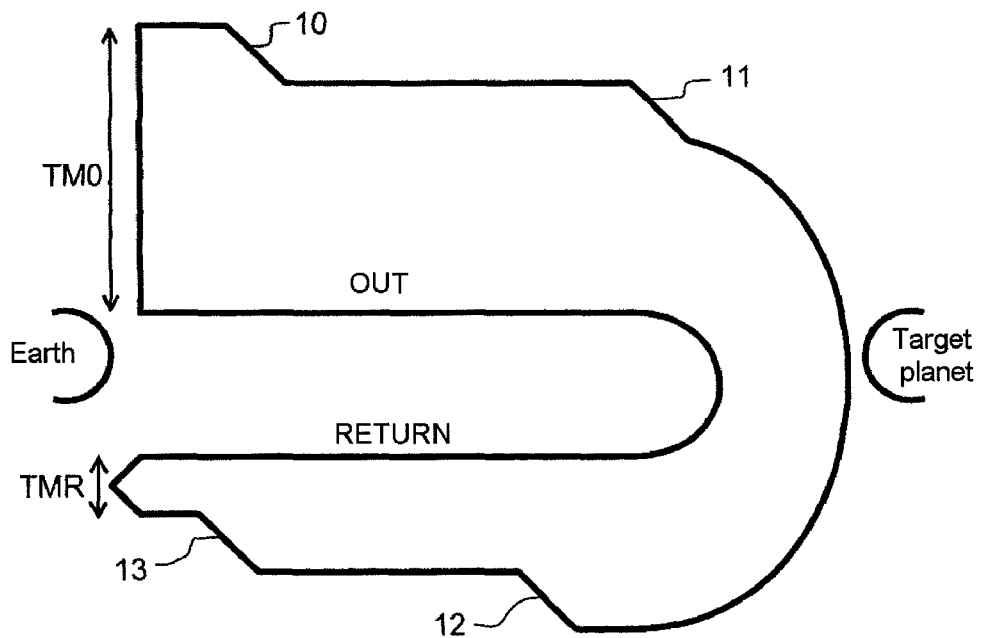
FIG. 1: a simplified schematic view of an example of the evolution of the weight of fuel in the course of an interplanetary mission, according to the prior art.

Referring to FIG. 1, the total weight TM0 of fuel onboard an orbiter spacecraft at launch decreases fiercely firstly during the phase of freeing of the craft with respect to the Earth and of its orientation 10 corresponding to a first speed variation equal to Delta V1 and secondly during the phase of braking 11 on the approach to the target planet and of landing on the latter corresponding to a second speed variation equal to Delta V2. During the spacecraft's return trip to Earth, the total weight of fuel decreases greatly a third time during the phase of departure 12 from the target planet corresponding to a third speed variation equal to Delta V3, then a fourth time during a phase of braking and landing 13 on Earth corresponding to a fourth speed variation equal to Delta V4.

Upon arrival on Earth, the remaining weight TMR aboard the spacecraft corresponds to the intrinsic weight of the spacecraft to which is added the weight of any passengers and/or of samples of matter collected from the target planet. The weight of fuel is generally fully consumed during the craft's return trip between the Earth and the target planet.

During each of the first three phases of the flight of the craft, the fuel consumption has been increased because of the extra weight of fuel stowed onboard to carry out the braking and landing operations during the fourth phase. Indeed, during each of the first three phases, the total weight of the craft to be braked or accelerated is increased by the weight of fuel necessary for the fourth phase to which must be added the extra weight of fuel necessary to carry out the acceleration or the braking of a greater weight. This phenomenon is called the "snowball" effect.

To these four main phases which are the heaviest consumers of fuel, are added intermediate operations comprising manoeuvres in space and in the orbit of the planets which increase the "snowball" effect.

Figure 2:
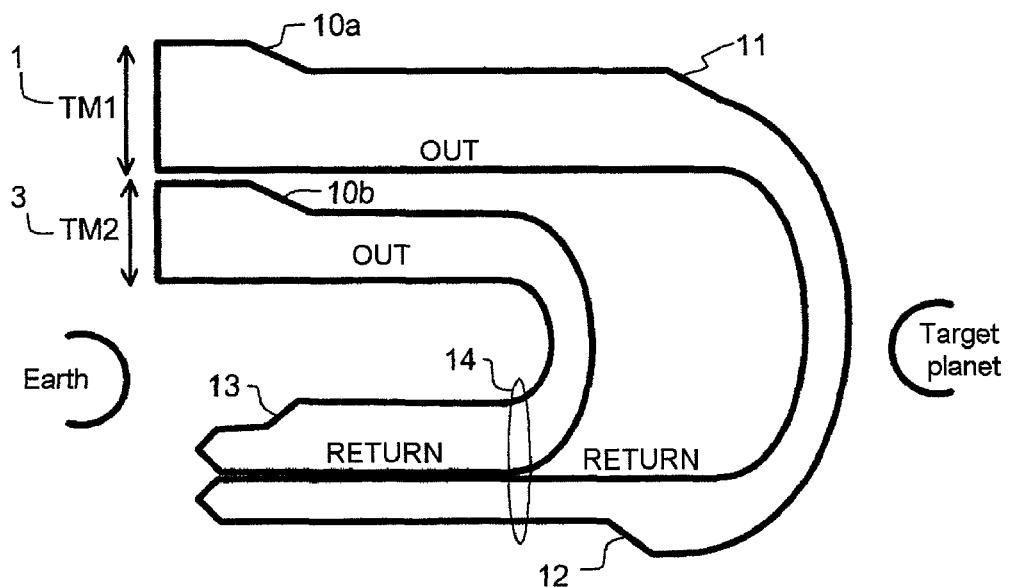
FIG. 2: a simplified schematic view of the evolution of the weight of fuel in the course of an interplanetary mission, according to the invention.

Referring to FIG. 2, according to the invention, a first orbiter spacecraft 1 having a total weight TM1 is sent on a first interplanetary trajectory towards the target planet to be explored and a second orbiter spacecraft 2 having a total weight TM2 is sent on a second interplanetary trajectory leading to a predetermined rendezvous spot that may possibly be situated for example, although this is not indispensable, on an interplanetary encounter orbit 30. The interplanetary encounter orbit 30 is preferably located between the target planet and Earth and may for example, although this is not indispensable, cross the orbit of the target planet and the orbit of the Earth. By way of variant, the encounter orbit could also be situated for example, mid-way between the target planet and Earth or else be positioned in the orbit of the target planet. Preferably, the second interplanetary trajectory does not comprise any phase of placing in orbit around the target planet. The second orbiter meets up with the rendezvous spot but at no time, either before, or during, or after the encounter, does it enter into orbit around the target planet since this would require successive braking and acceleration operations which are heavy fuel-consuming phases. The launch 10b of the second orbiter spacecraft 2 can be carried out either before or after the launch 10a of the first orbital spacecraft 1 but certain launch slots are preferable since they are more economical for reaching the predetermined rendezvous spot. Advantageously, the first spacecraft 1 stows onboard at launch, a weight of fuel just necessary for the accomplishment of a first part of the mission corresponding to the first three phases of the flight, 10a, 11, 12. The weight of fuel necessary for the fourth phase of the flight corresponding to braking and to entering into orbit 13 around the Earth, is stowed onboard the second orbiter spacecraft. After its launch, the second orbiter craft 2 moves on its own trajectory, towards the rendezvous spot, for example situated on the interplanetary encounter orbit 30, until the first orbiter craft 1 meets up with it. When the encounter at the rendezvous spot is effected, the first orbiter craft has exhausted the weight of fuel that it had carried during its launch. The second orbiter craft then takes over to accomplish and finish the fourth phase 13 of the mission.

According to a first embodiment of the invention, during the return trip by the first orbiter spacecraft 1 to Earth, when the first orbiter spacecraft 1 meets up with the second orbiter spacecraft 2 at the rendezvous spot, the two orbiter craft 1, 2 are tethered 14 together, then the two spacecraft return together towards the Earth, the second orbiter spacecraft 2 providing the fuel necessary for the return, braking and placement in orbit 13 of the two tethered craft around the Earth. The weight of the first spacecraft 1 at the time of the tethering of the two orbiter spacecraft 1, 2, is equal to its intrinsic weight increased by the weight of any load such as for example, any passengers and/or samples of matter collected from the target planet.

According to a second embodiment of the invention, during the return trip by the first spacecraft to the Earth, when the first orbiter spacecraft 1 meets up with the second orbiter spacecraft 2 at the rendezvous spot, the two orbiter craft 1, 2 are tethered 14 together, the second orbiter spacecraft 2 recovers the load such as for example, the passengers and/or the samples of matter collected from the target planet by the first orbiter craft 1, the two orbiter craft 1, 2 are thereafter untied and the second orbiter craft 2 returns to Earth alone, the first orbiter craft 1 being abandoned in space. This second embodiment of the invention makes it possible to further reduce the weight of fuel necessary for the exploration mission but requires an operation of transferring the passengers and/or the collected samples. Advantageously, to economize on additional fuel, during the transfer and/or loading operation, the first orbiter spacecraft 1 remains in orbit around the target planet and does not touch down on this planet. Likewise, preferably, on returning to terrestrial orbit, the second orbiter spacecraft 2, or a sub-assembly of the latter, does not touch down on the Earth but remains in orbit around the Earth. The recovery of the samples and/or passengers can be carried out, for example, by way of two rockets or two space shuttles, making the return trip on the one hand, between the target planet and the first orbiter craft in orbit around the target planet and on the other hand, between Earth and the second orbiter craft, or if appropriate, the two tethered orbiter craft together, in orbit around the Earth.

The use of two independent orbiter spacecraft sent on two different and optimized trajectories with a rendezvous point to transfer a load or link together the said orbiter spacecraft therefore makes it possible to distribute the weight of fuel over the two orbiter spacecraft and to avoid the "snowball" effect due to the fourth phase of the mission. This then makes it possible to economize on the additional weight of fuel related to this "snowball" effect and to reduce the cost of the mission with respect to the use of a single orbiter craft.

Thus, the total weight TM1+TM2 onboard the first orbiter spacecraft 1 and onboard the second orbiter spacecraft 2 is less than the total weight TM0 which would be stowed onboard if a single orbital spacecraft was sent to the target planet. Furthermore, the two weights TM1 and TM2 of each orbiter craft are much lower than the total weight TM0 of an orbiter craft of the prior art, thereby exhibiting the advantage of allowing the use of two smaller orbiter craft launched by smaller and therefore less expensive rockets.

Alternatively, this also makes it possible, if appropriate, in another type of mission consisting for example in returning a weight of samples and/or a greater number of passengers, to ensure a capacity to return this additional weight without increasing the size, and therefore the cost, of the rockets for launching the orbiter craft with respect to the prior art.

The various braking and acceleration manoeuvres carried out during the movement of the orbiter craft along their respective trajectories can be actuated by impulse actions, that is to say in the form of strong thrusts of brief duration, by using chemical propulsion means, or can be actuated by actions of weaker thrusts of long duration, using plasma or electrical propulsion means. The manoeuvres can also be carried out by a combination of the two types of propulsion means. In the case where a combination of two types of propulsion means is used on the first or the second orbiter craft, it is possible to segment this orbiter craft by separating, after use, one of the spent propulsion means, for example an electrical propulsion stage, before performing the next manoeuvre, so as to discard useless weight before carrying out the next manoeuvre.

Likewise, for any trajectory envisaged for each of the two orbiter craft, it is possible furthermore to add gravitational assistance manoeuvres using the Earth, the target planet, and/or any intermediate planet or moon usable on the said trajectory, including by modifying the latter so as to intentionally cross the planet used for the assistance.

Figure 3:
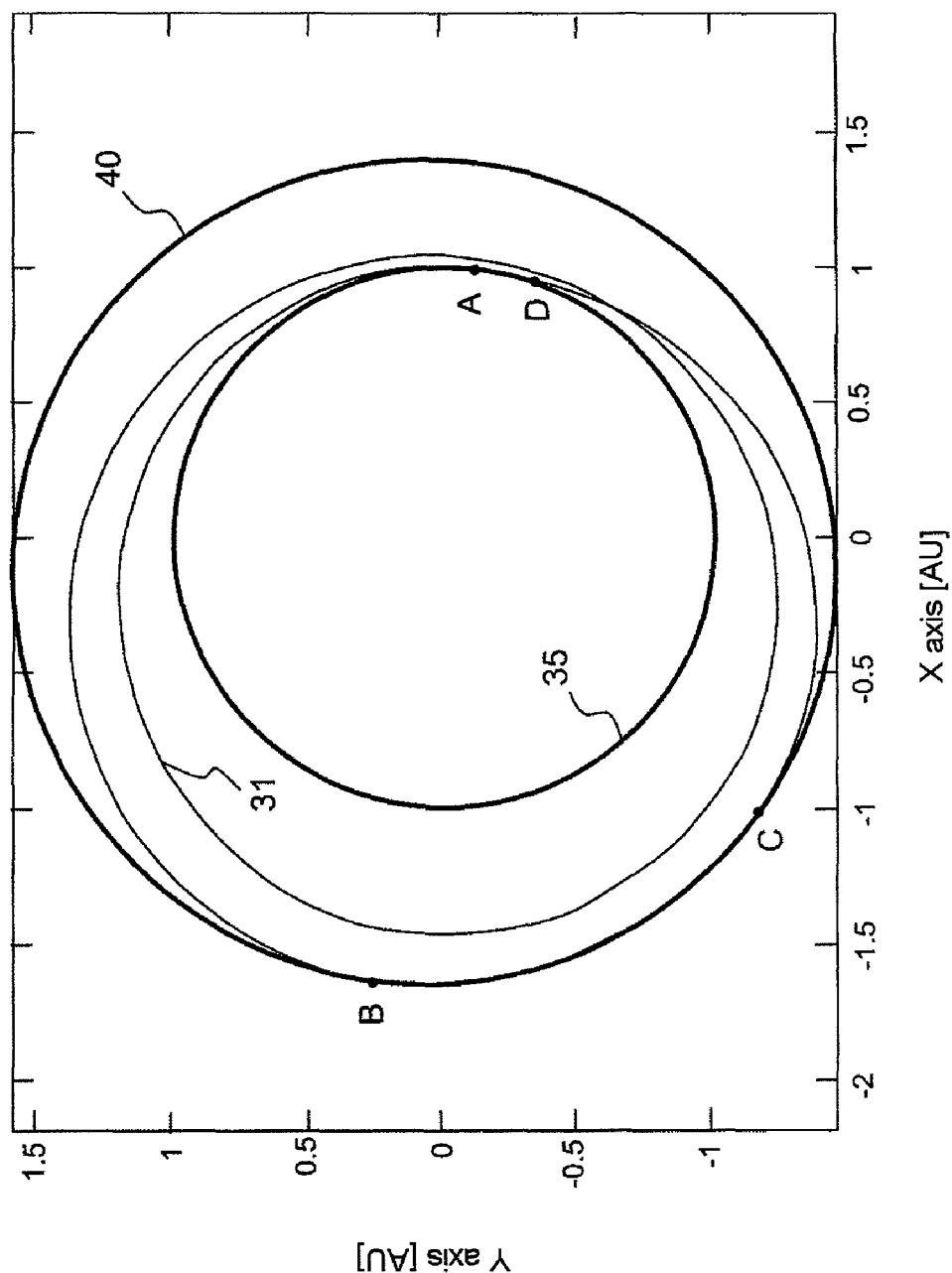
FIG. 3: a first example of a trajectory of a first orbiter spacecraft, according to the invention.
Figure 4:
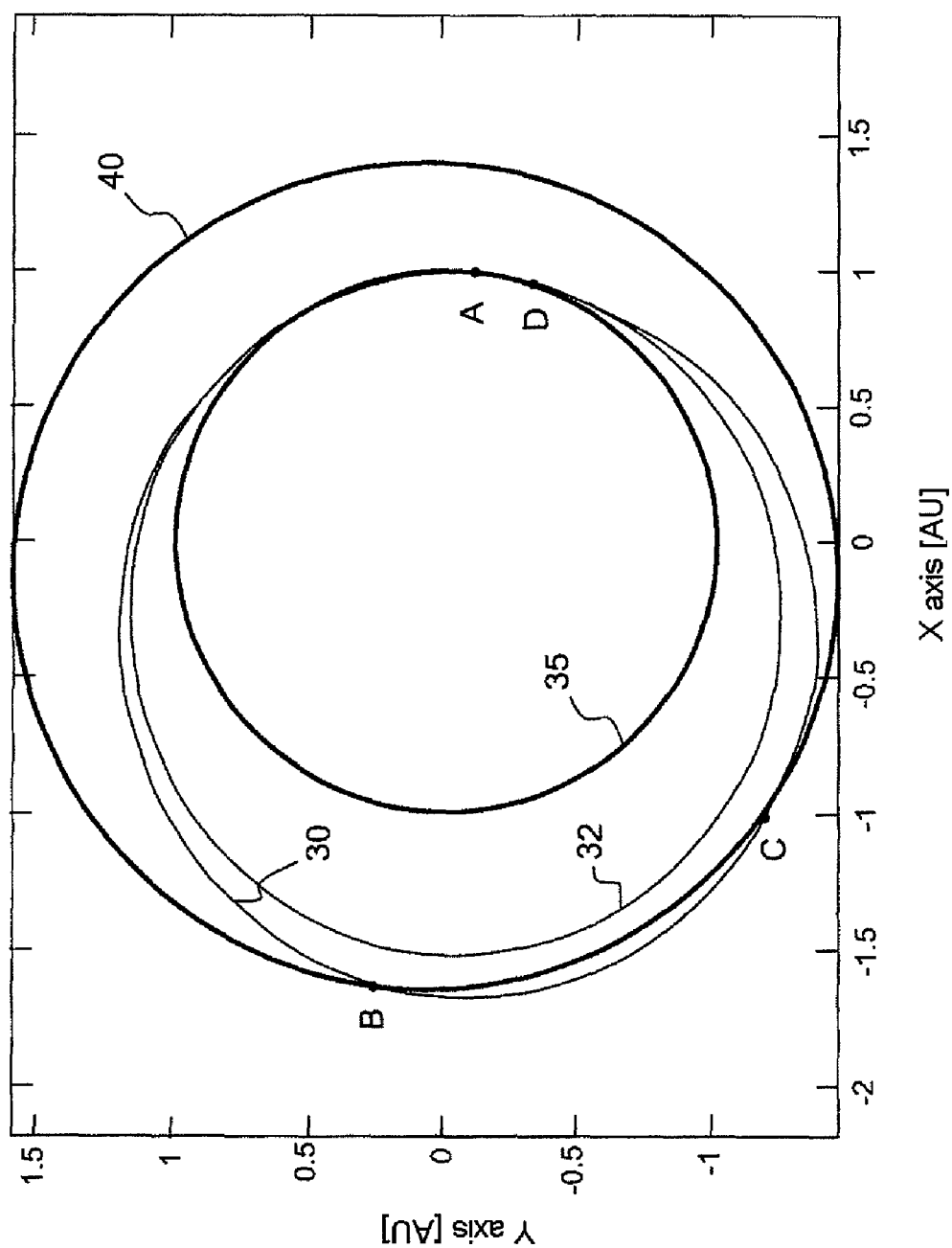
FIG. 4: a first example of a trajectory of a second orbiter spacecraft, according to the invention.

FIGS. 3 and 4 show first examples of trajectories of the first, respectively of the second orbiter spacecraft, in the ecliptic plane XY, the scales being in astronomical units. The trajectories of the Earth and of Mars, 35, 40, are represented as thickened lines. The two orbiter craft 1, 2 are launched independently of one another, on two different interplanetary trajectories, 31, 32, for example the same day, for example on 15 Sep. 2015 from the same location A on the Earth and heading for Mars. The first orbiter craft 1 enters orbit around Mars, at the point B, for example on 15 Nov. 2017, while the second orbiter craft 2 moves on a second interplanetary trajectory 32 located between the two planets Earth and Mars towards a predetermined rendezvous spot. In the example represented in FIG. 4, the rendezvous spot is situated on an interplanetary encounter orbit 30 which passes in proximity to the orbits of the two planets, but this is not indispensable. On a predetermined date corresponding to the passage of the second orbiter craft in proximity to the first orbiter craft, for example on 15 Mar. 2018, the first orbiter craft 1 leaves the Mars orbit at the point C and meets up with the second orbiter craft at the rendezvous spot, for example on the same day, in the interplanetary encounter orbit 30. The two orbiter craft are then tethered together and the two tethered craft return to Earth where they arrive at a location D, for example on 27 Aug. 2018. Alternatively, after the tethering of the two craft, the collected samples and/or the passengers are transferred from the first orbiter craft into the second orbiter craft, and then the two orbiter craft are untied and only the second orbiter craft and its load return to terrestrial orbit.

FIGS. 3 and 4 are merely non-limiting examples of trajectories. The departure strategy for leaving the Earth or the target planet can be different. Notably, for example, the orbiter craft can be placed directly on their trajectory towards the destination planet or be previously placed on one or more intermediate orbits.

Figure 5:
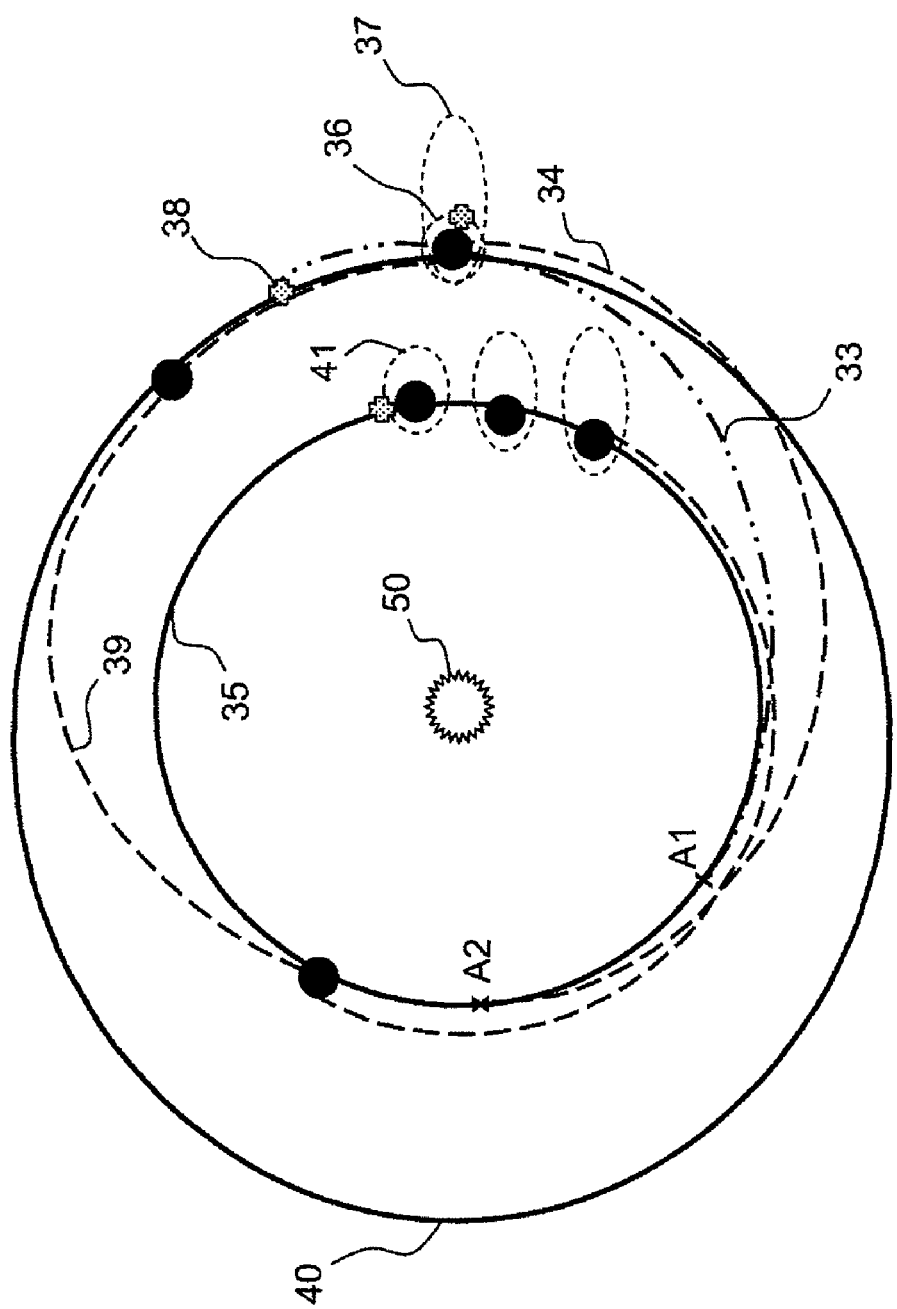
FIG. 5: a second example of trajectories of the two orbiter spacecraft using gravitational assistance manoeuvres to accelerate or brake the orbiter spacecraft, according to the invention.

FIG. 5 represents a second example of trajectories of the two orbiter spacecraft using gravitational assistance manoeuvres to accelerate or brake the spacecraft, thereby making it possible to further decrease the weight of fuel necessary for the accomplishment of the mission of the two orbiter craft. A gravitational assistance manoeuvre is an exchange of momentum between a planet and a spacecraft.

In FIG. 5 are represented the orbit 35 of the Earth around the Sun 50, the orbit 40 of the target planet around the Sun 50, and an exemplary evolution of trajectories, for each of the two orbiter spacecraft 1, 2. The first orbiter craft 1 is launched from the Earth, from the point A1, on a first trajectory 33 around the Sun 50 heading for the target planet, for example Mars. On arriving at Mars, the first orbiter craft 1 is placed in orbit 37 around Mars. By atmospheric or propulsive braking, the first orbiter craft 1 thereafter descends to a lower orbit 36 to recover a load by way of a rocket or a local space shuttle. The second orbiter craft 2, independent of the first orbiter craft 1, is launched from the Earth, from the point A2, on a second trajectory 34 around the Sun 50, different from the first trajectory 33. The second trajectory 34 goes from the terrestrial orbit 35 to an orbit 42, close to that of Mars, on which the rendezvous spot 38 is situated. On approaching Mars, the second orbiter craft 2 is placed in the orbit 42 around the Sun, for example, by using a first Mars gravitational assistance manoeuvre, accelerating the second orbiter craft 2 and modifying its trajectory in an appropriate manner. When the loading of the first orbiter craft 1 is finished, the first orbiter craft 1 can meet up with the rendezvous spot with a level of fuel just sufficient to leave the orbit of Mars. When the first orbiter craft 1 meets up with the second orbiter craft 2 at the rendezvous spot 38, an exchange of load from the first orbiter craft 1 to the second orbiter craft 2 or the linking together of the two orbiter craft 1, 2, is carried out. The orbiter 2 can thereafter perform a second sequence of change of orbit manoeuvres of low intensity therefore consuming little fuel, so as to undertake a second gravitational assistance with Mars and thus be injected into a transfer orbit 39 going from Mars to the Earth. On approaching the terrestrial orbit, a third sequence of gravitational assistances with the Earth makes it possible to reduce the energy of this transfer orbit 39 and to reduce the quantity of fuel necessary for the orbital manoeuvre in order to transfer the second orbiter craft 2 into an orbit 41 around the Earth. To minimize the weight of fuel required, the second orbiter craft 2 is injected preferably into a very elliptical orbit 41, the orbit possibly thereafter being progressively rendered almost circular when the second orbiter craft is at an altitude of only a few hundred kilometres, for example an altitude of the order of 400 km, by using a known technique of atmospheric braking. The technique of atmospheric braking makes it possible, by lowering the perigee in the upper terrestrial atmosphere, to dissipate the orbital energy of the spacecraft and to decrease the apogee while consuming a very small weight of fuel. The load can finally be transferred to a third spacecraft, placed for example in terrestrial orbit, such as for example a space station, for example the international space station ISS, a rocket, a space shuttle or another type of manned vehicle capable of performing terrestrial re-entry, or placed in an automatic atmospheric re-entry capsule which will return to touch down on Earth. If the load consists of samples subject to planetary protection restrictions, return via a manned vehicle is preferred.

Although the invention has been described in relation to particular embodiments, it is quite obvious that it is in no way limited thereto and that it comprises all the technical equivalents of the means described as well as their combinations if the latter come within the framework of the invention.

The invention claimed is:

1. A method for reducing a weight of fuel stowed onboard during an interplanetary mission, comprising the steps of:
   launching a first orbiter spacecraft from the Earth on a first interplanetary trajectory towards a target planet to be explored for recovering a load to be transported from the target planet to the Earth, and
   launching a second orbiter spacecraft from the Earth on a second interplanetary trajectory towards a rendezvous spot with the first orbiter spacecraft for effecting a docking of the two orbiter spacecraft and recovering the load by the second orbiter spacecraft at the rendezvous spot, wherein said rendezvous spot is located on said second interplanetary trajectory, not in a terrestrial orbit, and wherein the second interplanetary trajectory does not comprise any phase of placing the second orbiter spacecraft in orbit around the target planet, nor around any other planet, then returning at least the second orbiter spacecraft and the load, from the rendezvous spot to a terrestrial orbit.

2. The method according to claim 1, wherein the first orbiter spacecraft comprises, during its launch from the Earth, a total weight of fuel corresponding solely to the weight necessary for the accomplishment of a first part of the mission which finishes at the rendezvous spot, at the time of docking.

3. The method according to claim 2, wherein the second orbiter spacecraft comprises a total weight of fuel allowing it to take over from the first orbiter spacecraft after the docking and to finish the mission from the rendezvous spot until the return to terrestrial orbit.

4. The method according to claim 1, further comprising the steps of using at least one gravitational assistance of a planet or of a moon situated on the second interplanetary trajectory to further decrease the weight of fuel necessary for the accomplishment of the mission.

5. The method according to claim 1, further comprising, after the docking phase, in returning the two orbiter spacecraft tethered together to the terrestrial orbit.

6. The method according to claim 5, further comprising placing, on the second orbiter spacecraft, the weight of fuel necessary for the return of the two orbiter spacecraft from the rendezvous spot to the terrestrial orbit.

7. The method according to claim 1, further comprising, after the docking phase, in unloading the load from the first orbiter spacecraft into the second orbiter spacecraft, and then in abandoning the first orbiter spacecraft.

8. The method according to claim 1, further comprising recovering the load by way of a first rocket or of a first space shuttle launched from the target planet towards the first orbiter spacecraft and in leaving the first orbiter spacecraft in orbit around the target planet during the recovery of the load.

9. The method according to claim 1, further comprising unloading the load by way of a third spacecraft, chosen from among a space station, a second rocket, or a second space shuttle launched from the Earth towards the second spacecraft and in leaving the second spacecraft, or the two orbiter spacecraft tethered, in the orbit around the Earth.

10. The method according to claim 1, wherein rendezvous spot is located on an encounter orbit situated between the target planet and Earth.

11. The method according to claim 1, wherein the load consists of the passengers and/or of samples of matter collected from the target planet.

* * * * *